(12) United States Patent
Rhea

(10) Patent No.: US 7,873,427 B1
(45) Date of Patent: Jan. 18, 2011

(54) AUDIO FEEDBACK TEST

(75) Inventor: Paul A. Rhea, Lawrenceville, GA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

(21) Appl. No.: 12/563,771

(22) Filed: Sep. 21, 2009

Related U.S. Application Data

(62) Division of application No. 10/771,762, filed on Feb. 4, 2004, now Pat. No. 7,593,781.

(60) Provisional application No. 60/445,103, filed on Feb. 5, 2003.

(51) Int. Cl.
*G06F 17/00* (2006.01)
*H04R 29/00* (2006.01)

(52) U.S. Cl. .......................... 700/94; 381/58

(58) Field of Classification Search .................. 700/94; 381/56, 58, 59; 360/31; 717/134
See application file for complete search history.

(56) References Cited

U.S. PATENT DOCUMENTS

| | | | |
|---|---|---|---|
| 5,715,369 A | 2/1998 | Spoltman et al. | |
| 6,157,505 A | 12/2000 | Prockup | |
| 6,304,865 B1 | 10/2001 | Christensen et al. | |
| H2143 H | 2/2006 | Prockup | |
| 7,107,109 B1 | 9/2006 | Nathan et al. | |
| 2002/0083419 A1 | 6/2002 | Li et al. | |

OTHER PUBLICATIONS

American Megatrends AMIDiag for Windows User's Guide (Version 2.0), Feb. 25, 2002, http://ami.com/support.docc/MAN-DIAG-WIN.pdf.

*Primary Examiner*—Ping Lee
(74) *Attorney, Agent, or Firm*—Hope Baldauff Hartman LLC

(57) ABSTRACT

Methods and systems provide automated testing of computer facilitated audio input and output devices. A tone is converted from a digital to analog signal and is sent to a sound mixing device. At the sound mixing device, the analog tone is looped back through a recording line to an analog to digital converter. The recorded tone is converted from a time domain to a frequency domain using a Fast Fourier Transform (FFT) analysis. The frequency, and if desired, the intensity of the recorded tone is compared against the known frequency and at the desired intensity of the played tone. If the recorded tone is the same as the played tone, the ability of the sound card to play the tone is designated as passing.

4 Claims, 12 Drawing Sheets

AUDIO FEEDBACK TEST

CROSS-REFERENCE TO RELATED APPLICATIONS

This patent application is a divisional of U.S. Pat. No. 7,593,781, issued Sep. 22, 2009, and entitled "Audio Feedback Test," which claims the benefit of U.S. Provisional Patent Application No. 60/445,103, filed on Feb. 5, 2003, each of which are expressly incorporated herein by reference in their entirety.

FIELD OF THE INVENTION

Embodiments of the invention relate generally to the field of software and hardware testing. More particularly, embodiments of the invention relate to a method and system for automated audio feedback testing.

BACKGROUND OF THE INVENTION

In the modern computing environment, a variety of audio functions are available for use in association with computers including audio recording and playback. Many modern computers include audio output devices such as speakers and earphone jacks and audio input devices including microphones and CD players. In prior art systems, manufacturers or others interested in testing the audio functionality of computer hardware and software often required interaction with a human user. That is, testing of various audio characteristics and functionality of a computing system is most commonly performed by providing a user a known audio presentation such as a tone or mix of tones and requiring input from the user in response to the presentation. For example, the user may be provided a tone from the user's left speaker requiring the user to indicate which speaker the tone is emitted from, followed by a similar test from the right speaker. The user may be given a tone at various volumes and asked to verify the varying volumes as a way of verifying that the volume functionality of the audio output is functioning properly. If the user's response to any such test indicated that the tone or mix of tones heard by the user did not correspond with the intended audio presentation, the test failed. Conversely, if the test user responded affirmatively to the intended audio presentation, the test passed. Such prior art testing systems lack efficiency and are costly because of the requirement to utilize human test users. Moreover, because human test users may only respond to audio presentations within the audio range of the human test user, the breadth of testing that may be performed by the human test user is limited.

It is with respect to these and other considerations that the various embodiments of the present invention have been made.

SUMMARY OF THE INVENTION

In accordance with the present invention, the above-described problems are solved by methods and systems for automating the testing of computer facilitated audio input and output devices. Generally described, at the control of a testing software module, a sound-synthesizing module in a computer sound card generates and plays a tone at a known frequency and intensity. The tone is converted from a digital to analog signal and is sent to a software controlled sound mixing device. At the sound mixing device, the analog tone is looped back through a recording line to an analog to digital converter. The tone is converted from an analog to digital format and is then recorded. The recorded tone is compared to the generated tone. If the recorded tone is substantially similar to the generated tone, designating the sound card as passing the test.

According to an aspect of the invention, the recorded tone is converted from a time domain to a frequency domain using a Fast Fourier Transform (FFT) analysis program. The frequency, and if desired, the intensity of the recorded tone is compared against the known frequency, and at the desired intensity of the played tone. If the recorded tone is the same as the played tone, the ability of the sound card to play the tone is designated as passing. If not, the ability of the sound card to play the tone is designated as failing. By converting a played tone from digital to analog, feeding the tone back through a recording line, converting the tone from analog to digital, recording the tone, followed by analysis of the tone, a determination may be made as to the sound quality the tone would have if the tone was passed through an actual output line such as a speaker output line or earphone output line for receipt by a user.

According to another aspect of the invention, the FFT analysis results may be utilized to calculate a signal to noise ratio (SNR), a total harmonic distortion (THD) value, a total harmonic distortion plus noise (THD+N) and a DC-offset value. Each of these calculated values may be compared against pass/fail thresholds for the played tone. According to aspects of the invention, the audio feedback test may also be performed to test the record gain associated with a tone output. The audio feedback test may also be used to test audio output to right and left speaker outputs of a stereo speaker system. The audio feedback test may also be used to test sound mixing functionality of an audio/sound card, and the audio feedback test may be used to test a sound card's play of a tone through a variety of frequencies. The audio feedback test also may be used to test hardware configurations including a CD-ROM cable connection configuration.

These and various other features as well as advantages, which characterize the present invention, will be apparent from a reading of the following detailed description and a review of the associated drawings.

DETAILED DESCRIPTION OF THE PREFERRED EMBODIMENT

Figure 1A:
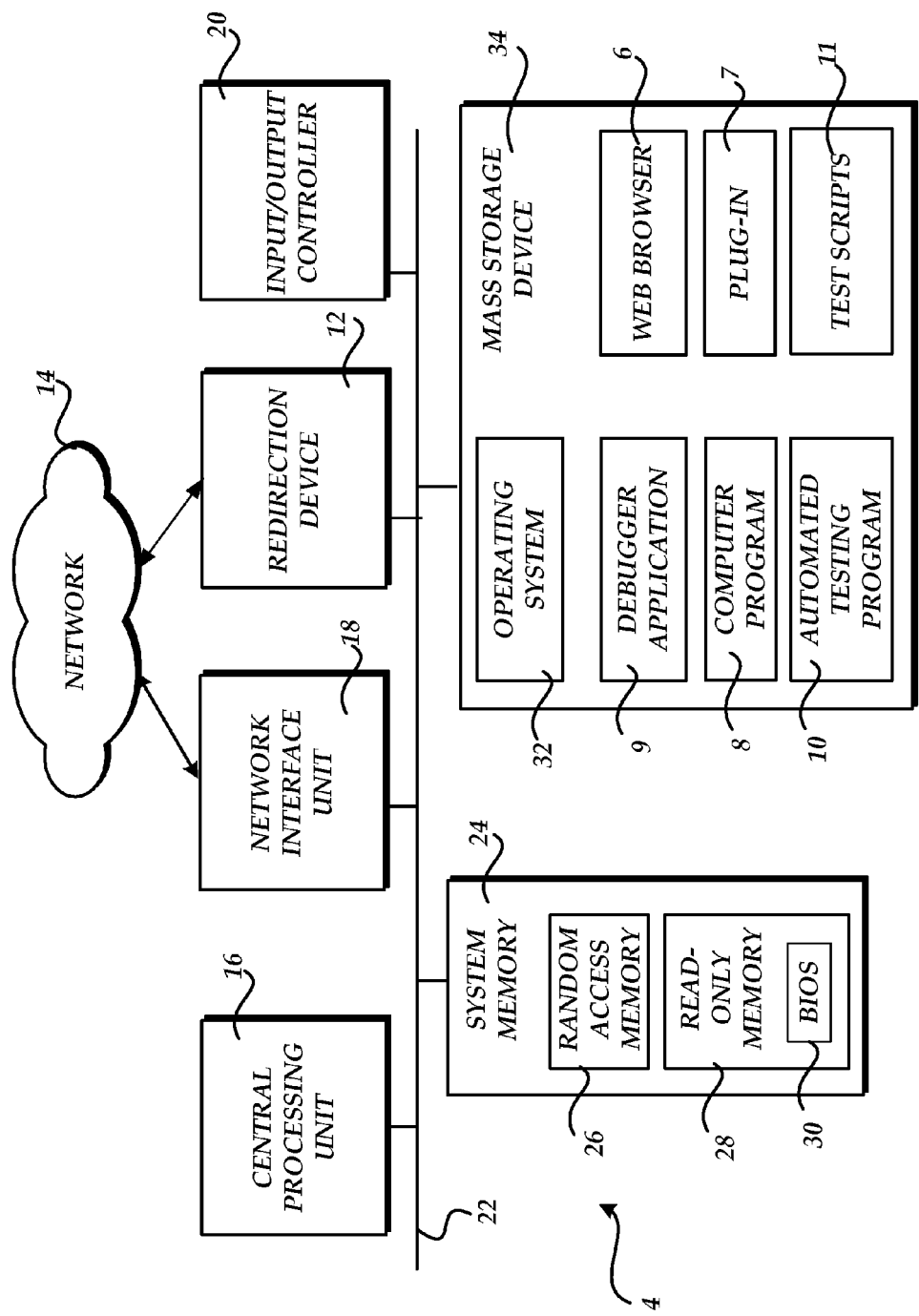
FIG. 1A illustrates a computer architecture for a computer system illustrated in various embodiments of the present invention.

As described briefly above, embodiments of the present invention provide methods and systems for automated audio feedback testing of computer sound cards. These embodiments may be combined, other embodiments may be utilized, and structural changes may be made without departing from the spirit and scope of the present invention. The following detailed description is, therefore, not to be taken in a limiting sense, and the scope of the present invention is defined by the pending claims and their equivalents.

Referring now to the drawings, in which like numerals refer to like elements through the several figures, aspects of the present invention and the exemplary operating environment will be described. FIGS. 1A, 1B, 1C, 1D, 2 and 3 and the following discussions are intended to provide a brief, general description of a suitable operating environment in which the embodiments of the invention may be implemented. While the invention will be described in the general context of program modules that execute in conjunction with an application program that runs on an operating system on a personal computer, those skilled in the art will recognize that the invention may also be implemented in combination with other program modules. Generally, program modules include routines, programs, components, data structures and other types of structures that perform particular tasks or implement particular abstract data types. Moreover, those skilled in the art will appreciate that the invention may be practiced with other computer system configurations, including hand-held devices, multiprocessor systems, multiprocessor-based or programmable consumer electronics, mini computers, mainframe computers, and the like. The invention may also be practiced in distributed computing environments where tasks are performed by remote processing devices that are linked through a communications network. In a distributed computer environment, program modules may be located in both local and remote memory source devices.

Operating Environment

Referring now to FIG. 1A, an illustrative computer architecture for a computer 4 for practicing the various embodiments of the invention will be described. The computer architecture shown in FIG. 1A illustrates a conventional server or personal computer, including a central processing unit 16 ("CPU"), a system memory 24, including a random access memory 26 ("RAM") and a read-only memory ("ROM") 28, and a system bus 22 that couples the memory to the CPU 16. A basic input/output system 30 containing the basic routines that help to transfer information between elements within the computer, such as during startup, is stored in the ROM 28. The computer 4 further includes a mass storage device 34 for storing an operating system 32 suitable for controlling the operation of a networked computer, such as the WINDOWS NT or XP operating systems from MICROSOFT CORPORATION of Redmond, Wash. The mass storage device 34 also stores application programs, such as the computer program 8, the automated testing program 10, the Web browser 6 and plug-in 7, and data, such as the test scripts 11 used by the automated testing program 10.

The mass storage device 34 is connected to the CPU 16 through a mass storage controller (not shown) connected to the bus 22. The mass storage device 34 and its associated computer-readable media, provide non-volatile storage for the computer 4. Although the description of computer-readable media contained herein refers to a mass storage device, such as a hard disk or CD-ROM drive, it should be appreciated by those skilled in the art that computer-readable media can be any available media that can be accessed by the computer 4.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the computer 4 may operate in a networked environment using logical connections to remote computers through a network 14, such as the Internet or a LAN. The computer 4 may connect to the network 14 through a network interface unit 18 connected to the bus 22. It should be appreciated that the network interface unit 18 may also be utilized to connect to other types of networks and remote computer systems. The computer 4 may also include an input/output controller 20 for receiving and processing input from a number of devices, including a keyboard, mouse, or electronic stylus (not shown in FIG. 1A). Similarly, an input/output controller 20 may provide output to a display screen, a printer, or other type of output device, including a sound card 300, 400 illustrated in FIGS. 2 and 3.

The computer 4 also includes a redirection device 12. As described above, the redirection device may be internal or external to the computer 4. The redirection device receives and compresses the video output of the computer 4 for transmission over the network 14. The redirection device 12 also transmits the compressed screen displays to a plug-in 7 executing on a remotely located computer, where the data may be decompressed and displayed. Because the redirection device 12 is implemented in hardware, operation of the redirection device 12 is not dependent on the execution of a particular type of operating system 32. Moreover, because the redirection device 12 is implemented in hardware, the operating system 32 does not have to be loaded by the computer 4 for the screen displays of the computer 4 to be compressed and transmitted. In this manner, the computer 4 may be remotely controlled immediately after it is powered on and without the need to load any operating system.

As discussed briefly above, the redirection device 12 also includes input/output ports for connecting peripheral input devices that would otherwise be connected to the computer 4. In particular, a mouse and keyboard (not shown in FIG. 1A) may be directly connected to the redirection device 12. Input commands received by these devices may then be passed by the redirection device 12 to the input/output controller 20. Additionally, user input commands may also be received by the plug-in 7 at a remote computer. These commands may be generated by a user or by an automated testing program 10 and are transmitted by the plug-in 7 to the redirection device 12. The remotely generated commands are also passed from the redirection device 12 to the input/output controller 20 for execution on the computer 4 as if the commands were generated locally. In this manner, the operation of the computer 4 and, in particular, the operation of the computer program 8, may be completely controlled from a remote computer.

Figure 1B:
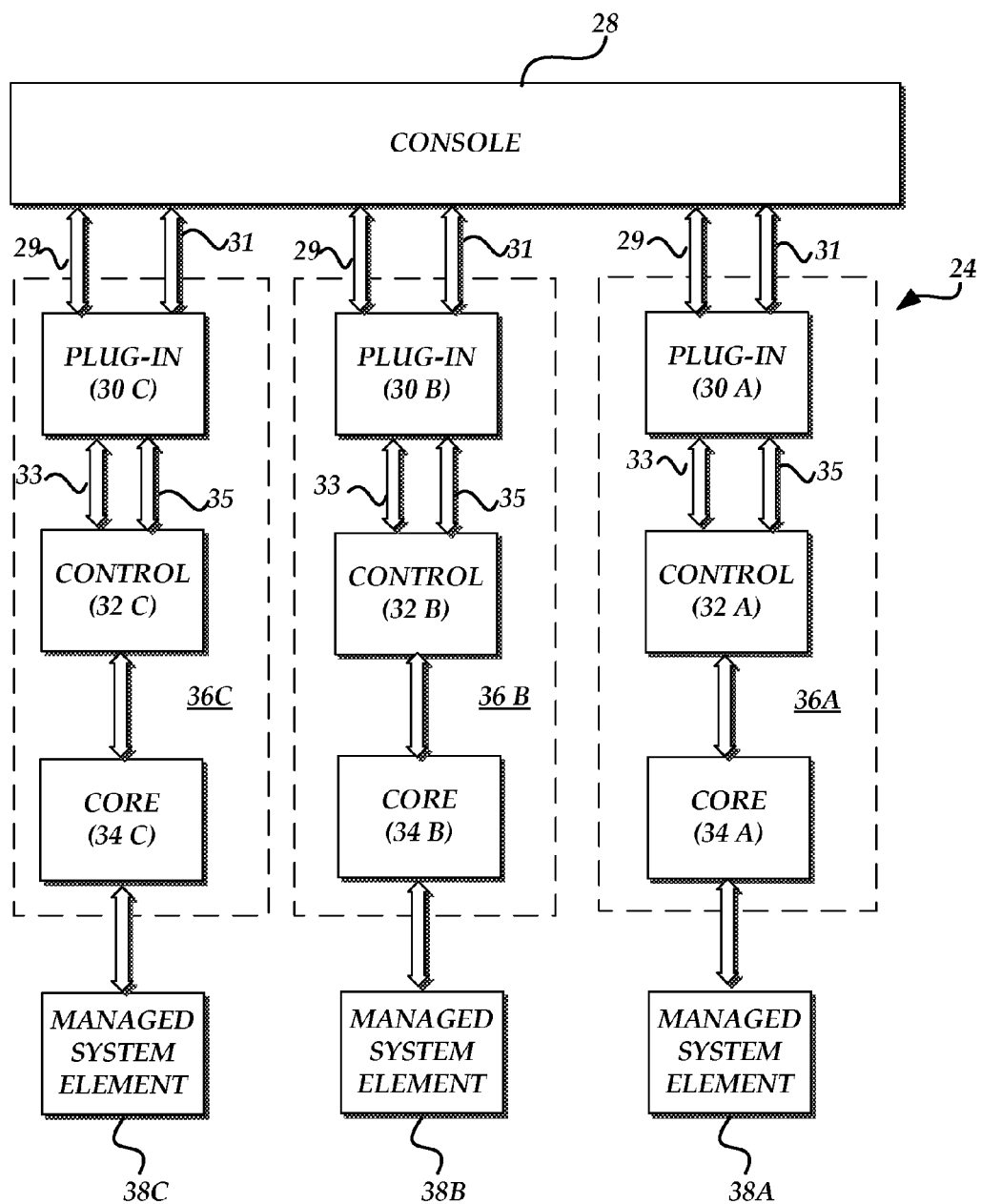
FIG. 1B is a software architecture diagram illustrating an illustrative software architecture for a diagnostics application program provided according to one embodiment of the present invention.

Turning now to FIG. 1B, various aspects of a diagnostics application program 24 will be described. As mentioned briefly above, the diagnostics application program 24 comprises one or more executable software components capable of performing tests on the computer 4 and diagnosing failures and potential failures within the various systems of the computer 4. According to one embodiment of the invention, the diagnostics application program 24 is implemented as a multi-layer stack. At the top of the stack is a console application 28 and at the bottom of the stack is one or more managed system elements 38A-38C.

The console application 28 comprises an executable application program for controlling the operation of the diagnostics application program 24. For instance, the console application 28 may receive user input identifying particular managed system elements 38A-38C upon which diagnostics should be performed. The console application 28 may also receive the identities of particular tests that should be performed on the managed system elements 38A-38C. Additionally, the console application 28 may receive and display information regarding the progress of the diagnostic and its success or failure once the diagnostic has been completed. The console application 28 may also provide other functionality for executing diagnostics in a batch mode.

In order to provide the above-described functionality, the console application 28 communicates with a diagnostics "triplet" 36A-36C for each managed system element 38A-38C. A triplet 36A-36C comprises a plug-in 30A-30C, a diagnostics control module 32A-32C, and a diagnostics core 34A-34C. The plug-ins 30A-30C relay diagnostic information between the console 28 and the control 32 and convert system information from a proprietary format to a format usable by the console 28. Moreover, the plug-ins 30A-30C receive input such as the selection of particular diagnostic test settings and pass the information to the connected diagnostics control module 32. Other types of commands, such as commands for starting or stopping a diagnostic, may also be passed from the plug-ins 30A-30C to the appropriate diagnostics control module 32A-32C. In order to facilitate communication between the plug-ins 30A-30C and the console application 28, an interface 29 is provided for exchanging system information and a separate interface 31 is provided for exchanging diagnostic information.

The diagnostic cores 34A-34C communicate directly with the appropriate managed system element 38A-38C and perform the actual diagnostic tests. The diagnostic cores 34A-34C also gather information about a particular managed system element 38A-38C and pass the information to the appropriate diagnostics control modules 32A-32C. The diagnostics control modules 32A-32C then pass the information back to the appropriate plug-in 30A-30C.

According to various embodiments of the invention, the diagnostics control modules 32A-32C and the plug-ins 30A-30C are implemented as component object model ("COM") objects. The diagnostics control modules 32A-32C and the plug-ins 30A-30C communicate via an interface 33 for exchanging system information 33 and a separate interface 35 for exchanging diagnostic information. The diagnostic cores 34A-34C are implemented as standard dynamically linked libraries ("DLLs").

It should be appreciated that a managed system element 38A-38C may comprise any of the components of a computer system, including software components. For instance, a managed system element 38A may comprise a graphics card or processor, an audio card or processor, an optical drive, a central processing unit, a mass storage device, a removable storage device, a modem, a network communications device, an input/output device, or a cable. According to embodiments of the present invention the managed system element includes the audio/sound cards 300, 400. Testing of sounds and tones and hardware described below may be performed by the diagnostic cores 34A-34C and the analysis function of the core may be directed by the console application 28. It should also be appreciated that this list is merely illustrative and that managed system elements 38A-38C may comprise other types of computing components.

Figure 1C:
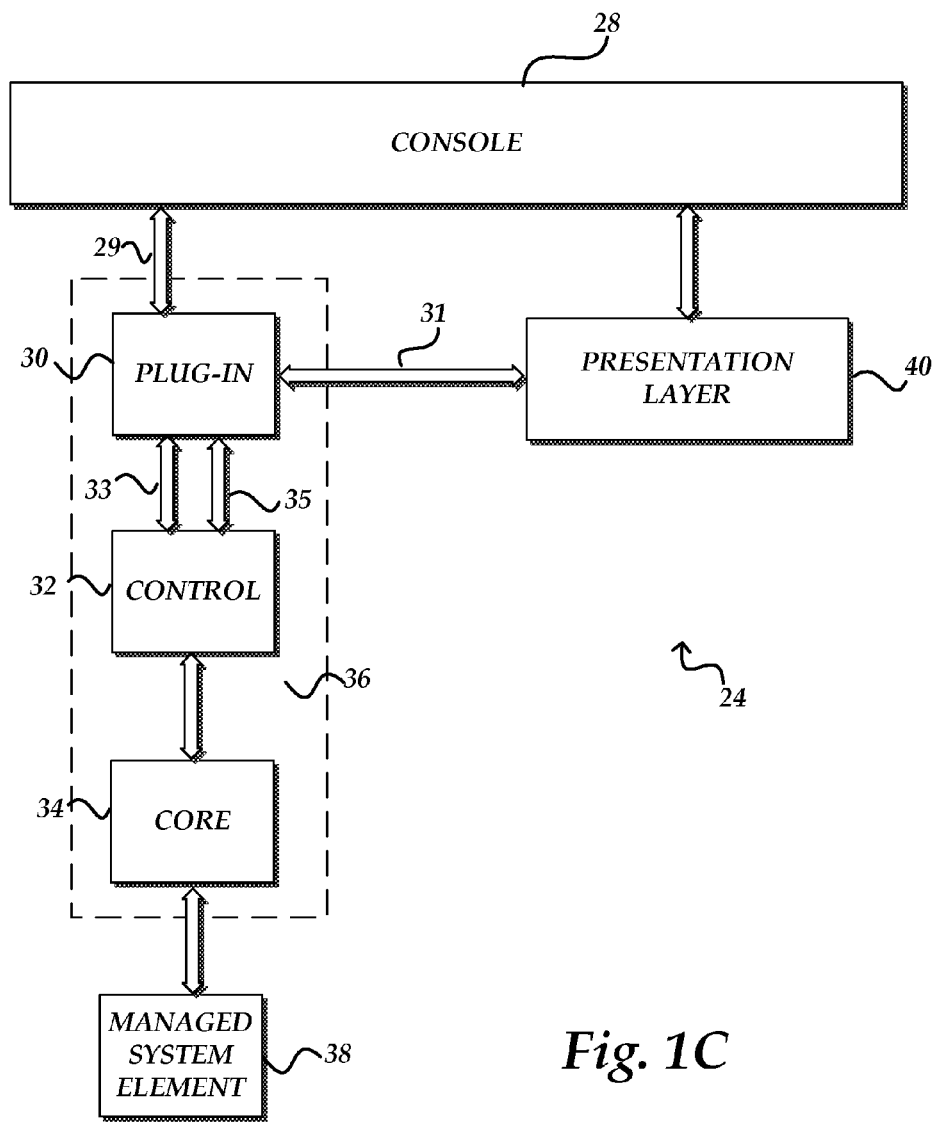
FIG. 1C is a software architecture diagram showing aspects of an illustrative software architecture for a diagnostics application program provided according to one embodiment of the present invention.

Referring now to FIG. 1C, additional aspects of a diagnostics application program 24 provided according to various embodiments of the invention will be described. As shown in FIG. 1C, a separate presentation layer 40 for diagnostic information may be interposed between each of the plug-ins 30A-30C and the console application 28. The console application 28 and the plug-ins 30 retain the interface 29 for communicating system information. However, the console application 28 and the plug-ins 30A-30C can communicate diagnostics information through the presentation layer 40 as if they were communicating directly with each other.

According to various embodiments of the invention, the presentation layer 40 provides an interface to the plug-ins 30A-30C to external programs. For instance, according to one embodiment of the invention, the presentation layer 40 provides functionality for utilizing the diagnostics triplet 36 with a console other than the console application 28, such as a console application provided by a third-party manufacturer. Similarly, the presentation layer 40 may provide functionality for accessing the triplet 36 from a script or a Web page.

In order to provide the above-described functionality, the presentation layer 40 is implemented as an ACTIVEX control in one embodiment of the invention. As known to those skilled in the art, ACTIVEX controls are a type of COM component that can self-register. COM objects implement the "IUnknown" interface but an ACTIVEX control usually also implements some of the standard interfaces for embedding, user interface, methods, properties, events, and persistence. Because ACTIVEX components can support the object linking and embedding ("OLE") interfaces, they can also be included in Web pages. Because they are COM objects, ACTIVEX controls can be used from languages such as VISUAL BASIC, VISUAL C++, and VBSCRIPT from MICROSOFT CORPORATION, and JAVA from SUN MICROSYSTEMS.

Figure 1D:
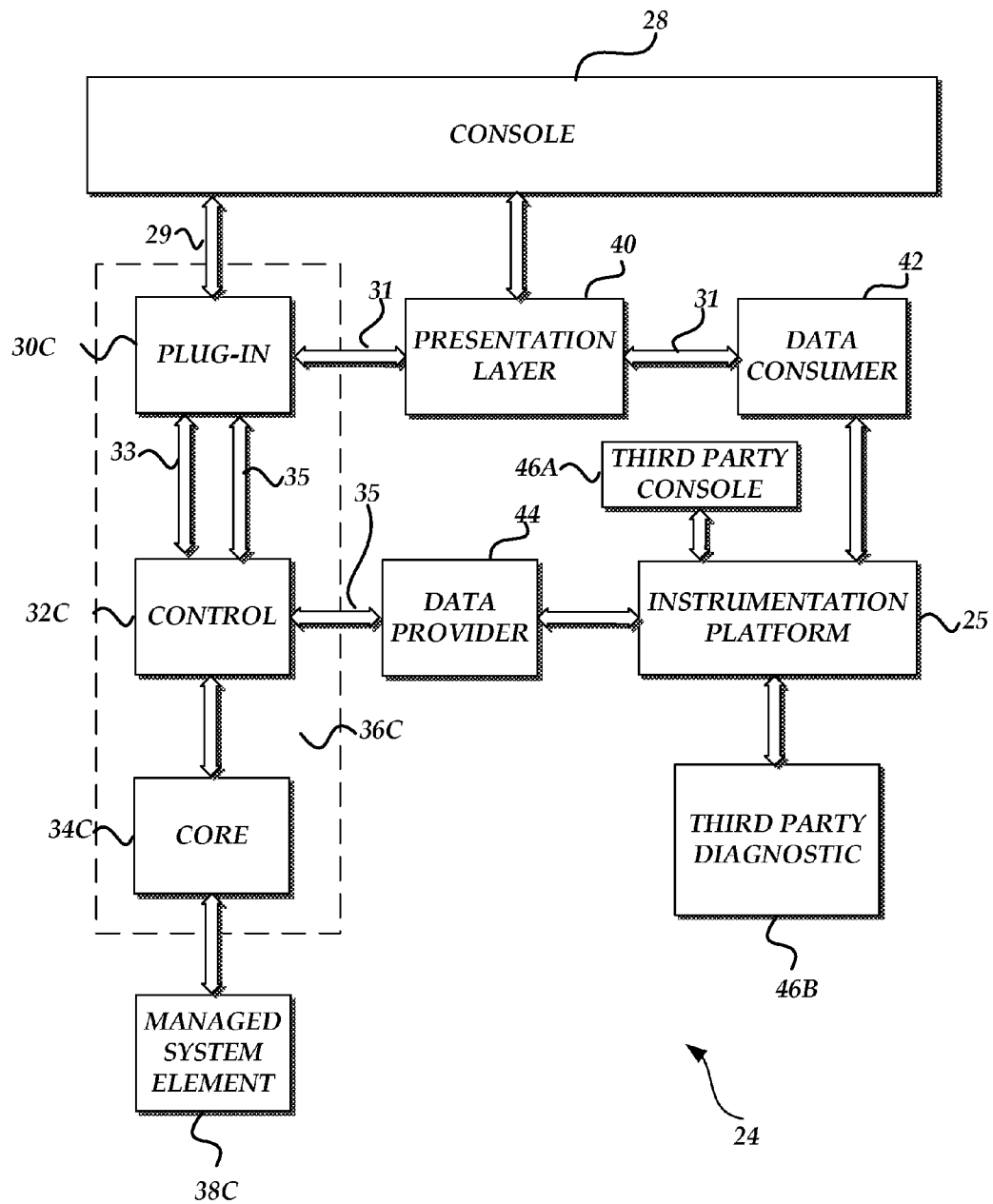
FIG. 1D is a software architecture diagram illustrating an illustrative software architecture for a diagnostics application program provided according to one embodiment of the present invention.

Turning now to FIG. 1D, additional aspects of a diagnostics application program 24 provided according to various embodiments of the invention will be described. As shown in FIG. 1D, in various embodiments of the present invention, an instrumentation data consumer 42 and an instrumentation data provider 44 are provided for enabling communication with an instrumentation platform 25.

The instrumentation data provider 44 provides a communication path between the instrumentation platform 25 and the diagnostic control module 32C. In this manner, a third-party console 46A may utilize the diagnostic control module 32C and receive diagnostic information regarding the managed system element 38C. Moreover, the instrumentation data provider 44 may generate event messages compatible for use with the instrumentation platform 25. Other objects may subscribe for these events through the instrumentation platform 25 and receive the event messages without polling a results object. Additional details regarding the operation of the instrumentation data provider 44 will be described in greater detail below.

The instrumentation data consumer 42 provides a communication path between the instrumentation platform 25 and the presentation layer 40. Through the instrumentation data consumer 42, the presentation layer 40 and the console application 28 have access to diagnostic information maintained by the instrumentation platform 25. For instance, through the instrumentation data consumer 42, the presentation layer 40 can execute and receive diagnostic result messages from third-party diagnostics 46B configured for use with the instrumentation platform 25 and not otherwise usable by the console application 28. Additionally, the data consumer 42 may register to receive diagnostic event messages from the instrumentation platform 25. The event messages when received may then be converted by the data consumer 42 for use by the presentation layer 40 and the console application 28. Additional details regarding the operation of the instrumentation data consumer 42 will be described in greater detail below.

Figure 2:
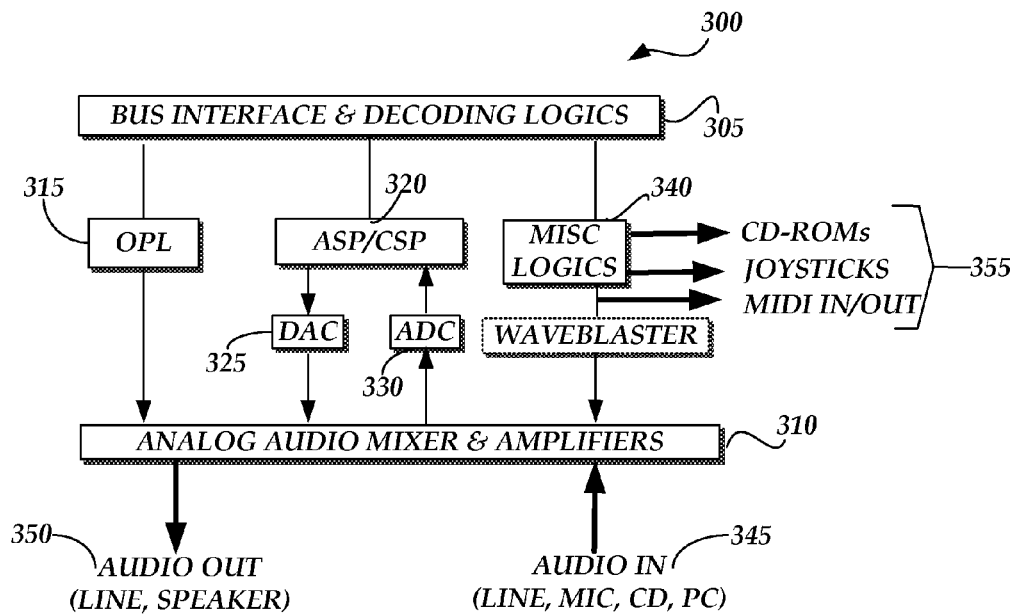
FIGS. 2 and 3 illustrate simplified block diagrams of computer sound cards.

Turning now to FIG. 2, an exemplary computer sound card 300 or soundboard for use in accordance with the embodiments of the present invention is described. The sound card illustrated in FIG. 2 may be connected to the computer 4 illustrated in FIG. 1A as an input/output controller 20 for receiving digitized sound data and for converting the sound data to audio format for presentation to a user through a speaker output, earphone output and the like. Likewise, the sound card 300 may be used for receiving audio input such as through a microphone or CD input line and for converting the audio input to a digital format for transmitting data to a memory storage device such as the memory 26 of the computer 4 for subsequent editing and use. As is well known to those skilled in the art, a sound card is a type of expansion board for a computer that allows the playback and recording of sound, such as from a WAV or MIDI file or from a music CD-ROM. An exemplary sound card 300 for use in accordance with the present invention is a SoundBlaster, which includes a family of sound cards manufactured by Creative Technology and Creative Labs.

Referring to FIG. 2, the sound card 300 includes a bus interface and decoding logics connector 305 for connecting to the computer 4 via the bus 22. A digital to analog circuit (DAC) 325 is provided for converting digital sounds to analog sounds for the presentation to a user through audio output such as a speaker or earphone line. An analog to digital circuit (ADC) 330 is provided for converting analog sounds received through an audio input line 345 such as a microphone to a digital input for processing using a digital computer 4. Miscellaneous logics 340 are included for providing functionality associated with miscellaneous input and output devices 355, including CD-ROM, MIDI input and output devices and joysticks. An analog audio mixer and amplifier device 310 is disposed between the audio output 350 and the audio input 345 and the DAC 325 and the ADC 330 for providing other functionality including sound mixing and sound amplification.

Figure 3:
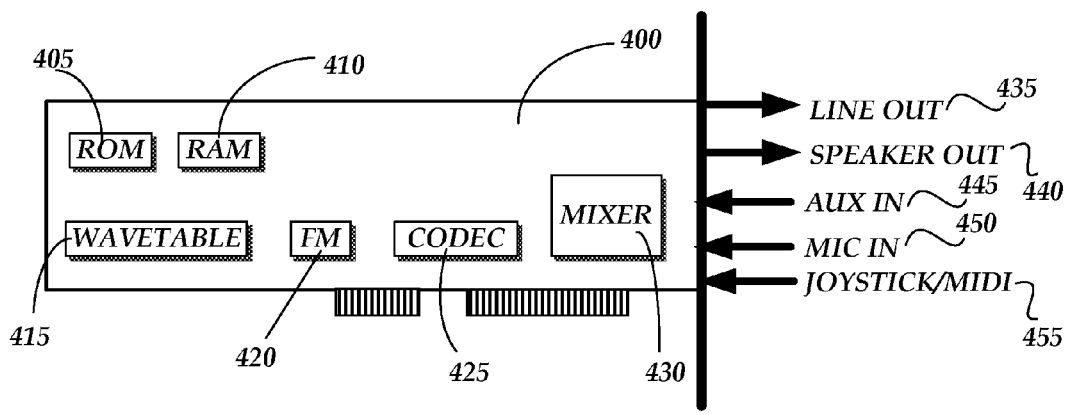

Referring now to FIG. 3, another computer sound card 400 is described. As described with reference to FIG. 2, an exemplary sound card 400 is a SoundBlaster sound card. The sound card 400 includes a read only memory (ROM) component 405 which includes the preset wave table synthesizer samples (sounds and tones) which according to an embodiment of the present invention includes preset wave table synthesizer samples for looping internally in the sound card through a record input line for testing cards 300 or card 400 in accordance with embodiments of the present invention. That is, the ROM 405 includes pre-produced or recorded sounds at known frequencies, known noise levels and known intensities for use in comparing to a recorded version of those sounds according to embodiments of the present invention. The random access memory (RAM) component 410 includes memory space for storage of recorded sounds, software programming for operating the card 400 and for downloadable wave table instruments according to embodiments of the present invention.

The wave table synthesizer 415 produces output sounds of the samples contained in the ROM 405 and the RAM 410. The coder/decoder (CODEC) 425 is a hardware component that can convert audio or video signals between analog and digital forms similar to the components 325 and 330 described above with reference to FIG. 2. The CODEC 425 may also be used to compress and decompress audio and video data, as required. According to embodiments of the present invention the CODEC 425 is responsible for the audio to digital and digital to audio conversion of audio signals. The frequency modulation (FM) synthesizer 420 is responsible for playing FM sounds. The mixer 430 includes an analog mixer integrated circuit for mixing together sounds from various inputs such as a microphone, an auxiliary input, a wave table synthesizer 415 and FM synthesizer 420 and a CD-ROM audio input to a final mix which is then sent to line level and speaker outputs 435 and 440. According to an embodiment of the present invention tested sounds (tones) are looped back through a record-in after receipt by the mixer 430. A variety of input output lines including a line out 435, a speaker out 440, an auxiliary in 445, a microphone in 450, and a joystick/MIDI 455.

Operation

According to the embodiments described below, testing and display of results associated with the following tests are controlled and performed at the control of software modules in conjunction with the cores 34A, B, and C and console application 28 described above with reference to FIGS. 1A, 1B, 1C, and 1D where the sound card 300, 400 and subcomponents of the sound card serve as a managed system elements 38A, B, and C.

Figure 4:
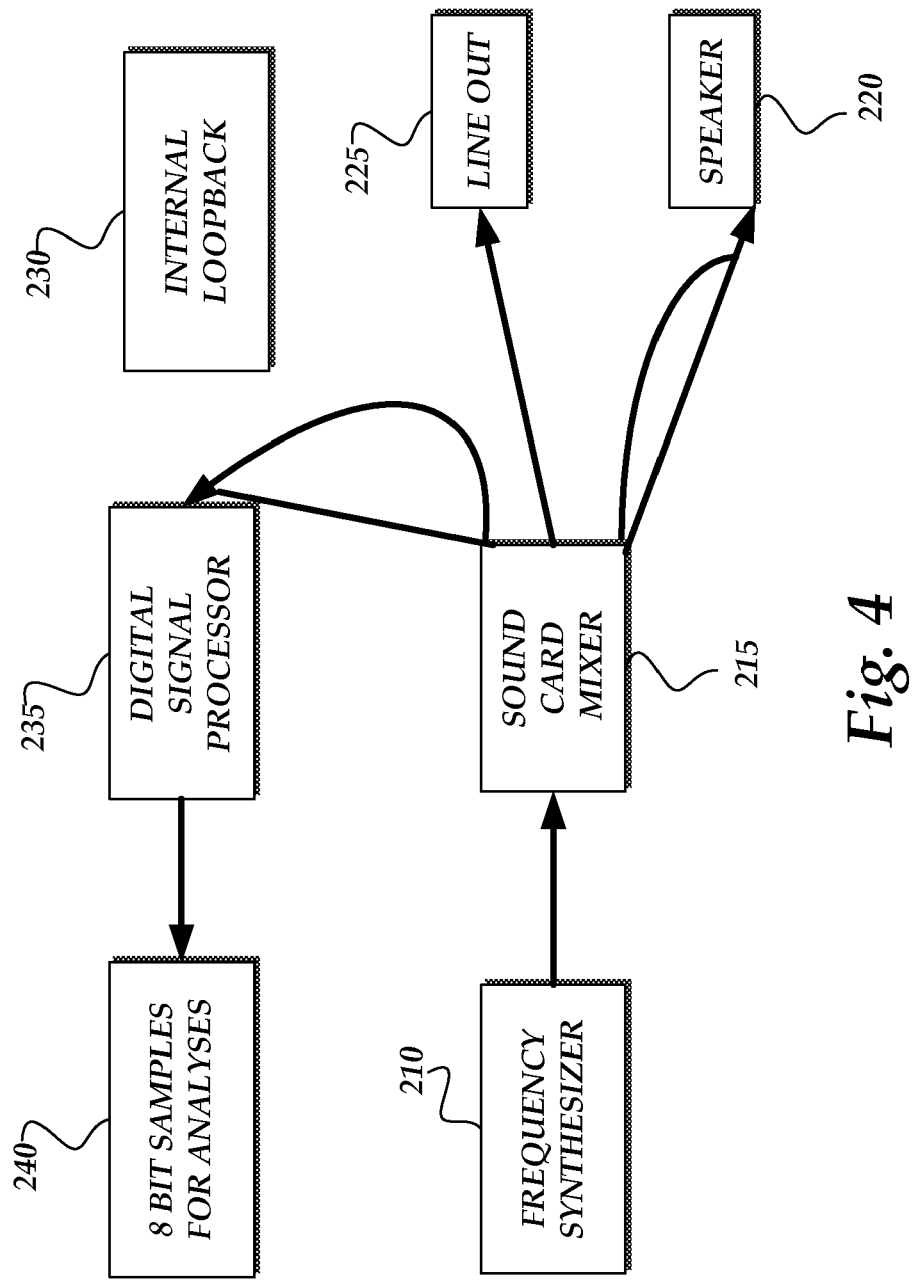
FIG. 4 is a simplified block diagram illustrating an operational flow of a loopback test performed to determine the proper operation and functionality of a computer audio sound card.

Referring now to FIG. 4, a simplified block diagram illustrating a basic operational flow of a loopback test performed to determine the proper operation and functionality of a computer audio/sound card and related software is described. The tests performed according to the operational flow described with reference to FIG. 2 are performed to test the operability of sound cards such as the sound cards 300 and 400, describe above. Additionally, if tests performed to determine the operability of the sound cards fail, as should be understood by those skilled in the art, sound cards or components contained therein may be replaced to isolate the sound card as being associated with a problem in order to test a software application responsible for providing digitized sound data from another memory source such as the memory 26 illustrated in FIG. 1A.

According to an exemplary embodiment of the present invention, the test performed on the sound cards 300 and 400 are looped through the sound card internally by playing a pre-produced sound to a mixer, followed by looping the sound back through a record line, followed by a comparison of the played sound to the recorded sound. Generally described then, the functionality of an audio electronics device such as the cards 300 and 400 may be tested for sound quality without the need to play sounds to a human test user.

Individual recording input lines such as the auxiliary in and microphone lines 445 and 450 and individual output lines such as the line out 435 and speaker out 440 may be tested for proper operability. If a given test fails, a tester may use the results of the test to check hardware components, as described above. If the tester determines that all hardware components are in good working order, then software modules responsible for emitting and controlling audio presentation may be tested. Advantageously, the need for a human test subject to listen to a test sound and report a finding is eliminated.

Referring still to FIG. 4 and according to embodiments of the present invention, a standard set of application programming interfaces (API) are used to play a sound through an output line such as the speaker line, MIDI output or auxiliary output, or CD output line. Another API causes the played sound to be recorded by looping the played sound back through a record line such as a microphone or CD record line. As shown in FIG. 4, the test may be executed without a loopback between the line in and line out. That is, a physical loop connector external to the audio card connecting a line out to a line in is not necessary owing to the embodiments of the present invention. The invention uses a MIDI input and MIDI output internal loopback mechanism 230. As known to those skilled in the art, MIDI is an acronym for Musical Instrument Digital Interface. The MIDI is a serial interface standard that allows for the connection of music synthesizers, musical instruments, and computers. The MIDI standard is based partly on hardware and partly on a description of the way in which music and sound are encoded and communicated between MIDI devices. The information transmitted between MIDI devices is in a form called a MIDI message, which encodes aspects of sounds such as pitch and volume as 8 bit bites of digital information. MIDI devices can be used for creating, recording, and playing back music. Using MIDI, computers, synthesizers and sequencers can communicate with each other, either keeping time or actually controlling the music created by other connected equipment. The MIDI internal loopback mechanism is used to loop a played sound back through a record line to a processor 235. Accordingly, using the MIDI input and MIDI output internal loopback mechanism 230 eliminates the need to have external loopback connectors such as between a speaker output and a microphone input.

Referring still to FIG. 4, the frequency synthesizer 210 is used to generate a known tone for passing to the mixer 215 for testing. As described above with reference to FIG. 3, a pre-produced sound or tone may be taken from the ROM 405 and provided to the frequency synthesizer 210, or wave table 415. The tone generated from the frequency synthesizer 210, wave table 415, or FM synthesizer 420 is passed through a sound card mixer 215 and the tones are passed through a line output 225 or speaker output 220 for presentation to a user. That is, during the test performed according to embodiments of the present invention, a human user may hear the tones or sound being generated by the frequency synthesizer, wave table or FM module for the internal loopback test.

Prior to passing the tone to the mixer the tone is converted from digital to analog just as would be the case where no test is being performed. After the analog tone is received by the mixer, the played tone is looped internally through the internal loopback mechanism 230 (MIDI in and MIDI out) to a digital signal processor 235. At the digital signal processor 235, according to embodiments of the present invention, the played tone is converted from analog to digital by the ADC circuit 330 or CODEC 425. The digital signal processor in accordance with the MIDI input and MIDI output loopback mechanism passes 8 bit samples of the played and recorded tones for the FFT analysis. The digital version of the tone or sound is converted from a time domain to a frequency domain using a Fast Fourier Transform (FFT) analysis. Prior to performing the FFT analysis the tone is recorded. By looping the tone through a known record line, operability of the line is checked because if a tone passes through to the recorder then at least the line will pass transmissions notwithstanding other problems that may be associated with the line or sound card in general.

If the recorded tone or sound and the played tone or sound are the same or substantially the same quality as a function a comparison of the FFT transformation results to the known frequency of the played tone, then the sound card components pass the test. An additional advantage of this process is that not only is the quality of the record out lines analyzed, but the basic question of which record out lines are operable at all is tested by iterating the process through all available record output lines when the tone is recorded. Once the operability and quality for any given record output line is confirmed, a registry key may be set for the "passed" line in the computer's registry so that the "passed" input or output line is available for future use.

In addition to the foregoing, analysis of the recorded sound allows for calculations of signal to noise ratio (SNR), total harmonic distortion (THD), total harmonic distortion plus noise (THD+N) and DC-Offset Values. Each such value may then be applied against acceptable thresholds for additional information about the proper operability of the sound card. For example, the SNR relates to how much stronger a signal is than background noise passed through a channel with the signal. The SNR is typically expressed in decibels, and the ratio is a measure of the quality of a transmission. Accordingly, if the SNR is calculated in accordance with the present invention for any given channel (input or output line) the SNR value may be used to determine whether the tested channel has passed or failed by comparing the SNR value to a threshold value considered acceptable by the manufacturer or tester of the sound card 300, 400.

The total harmonic distortion ratio is a ratio of the sum of the powers of all harmonic frequency signals (other than the fundamental) to the power of the fundamental frequency signal. The ratio is measured at the output of a device under specified conditions and is expressed in decibels. The total harmonic distortion plus noise (THD+N) is a measure of the audio clarity of an audio system. The best measure is zero percent and an average computer sound card for a voice channel typically operates at around 10% THD+N. According to embodiments of the present invention, the FFT analysis result of the recorded tone allows for calculation of the THD and THD+N values. If those values exceed an acceptable level, the associated channel (line in or line out) may be designated as having failed the test.

The DC-offset value is associated with the DC Bias value in an analog signal unintentionally introduced by analog devices as part of signal amplification or some other signal processing. The value obtained gives an indication of how much DC-offset is introduced, if any, during the analog signal loopback path. Accordingly, by calculating the DC-offset value through the FFT analysis, a determination can be made as to the amount of DC offset that is introduced when the played sound is converted to analog and looped back through a recording output line for analysis. If a determination is made that too much DC-offset is introduced, the associated channel (input or output line) may be designated as having failed the test.

Figure 5:
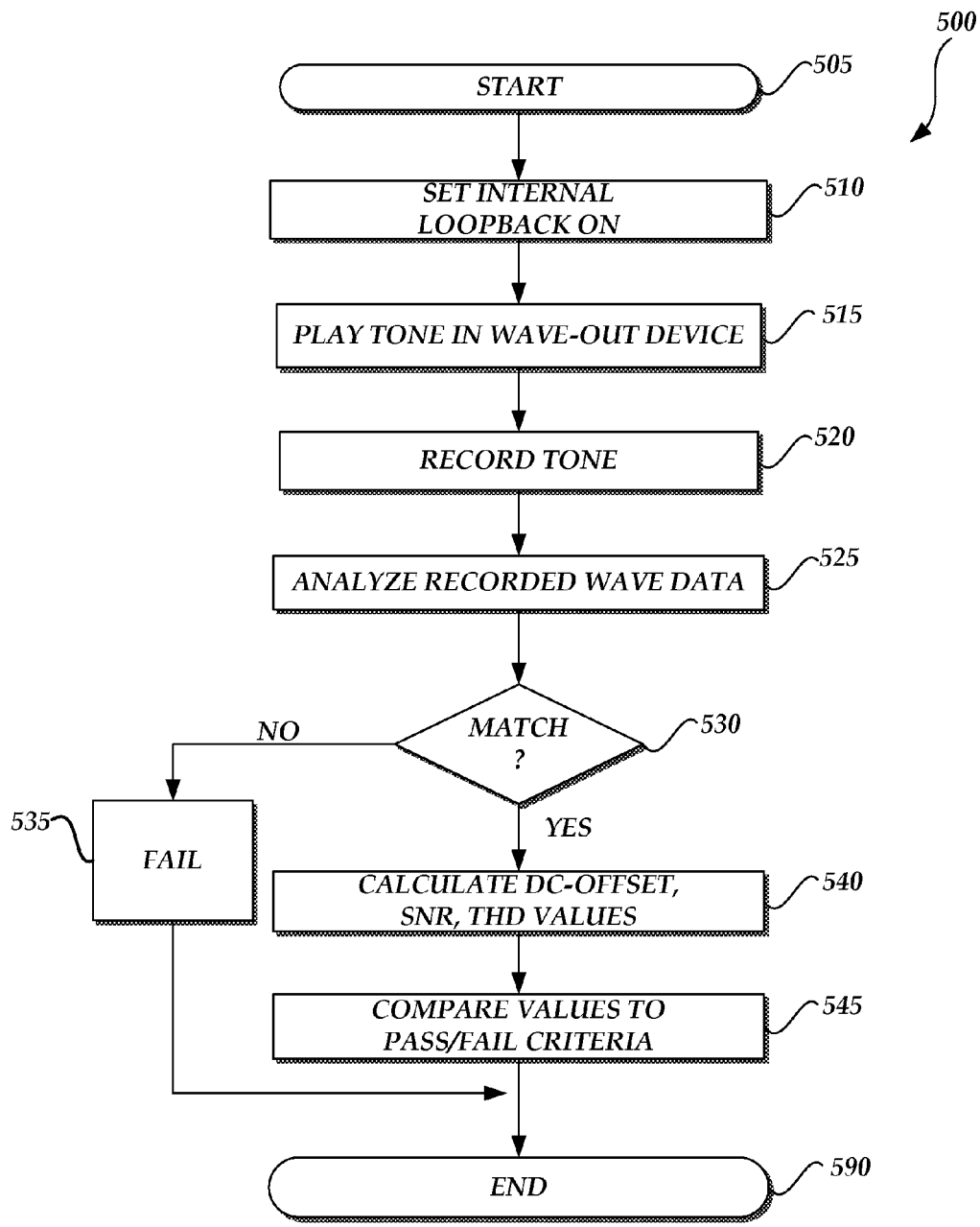
FIG. 5 illustrates an operational flow for non-interactive playback testing of a computer sound card.

FIG. 5 illustrates an operational flow for non-interactive playback testing for testing a computer sound card, as described above with reference to FIG. 4. The method 500 starts at start step 505 and proceeds to step 510 where an internal loopback function is set to ON to initiate a loopback test for a given record line. As described with reference to FIGS. 1B, 1C, 1D, the loopback function may be controlled via the core 34A, B, C via the console 28. As described above, prior to performing a loopback test using any given line as a record line, an initial iteration may be performed through all available record lines to determine which lines are operable apart from the quality of signal transmission through those lines. For example, a single pre-produced tone may be looped through available record lines separately. If the tone is received through a given record line, an initial determination is made that the line is operable. If no other test is performed, a registry key may be set in the computer 4 registry to indicate that the line is operable for future use.

At step 515, a single tone at a set frequency and intensity is generated from the frequency synthesizer 210, wave table 415, or FM synthesizer 420 and is passed through the CODEC 425 for conversion from digital to analog. After the tone is passed through the mixer 430, the tone is looped back using the internal loopback mechanism 230 through a selected record line such as a microphone input line to the digital signal processor 235. At the digital signal processor, the digital tone is passed through the CODEC 425 and is converted from analog back to digital. At step 520, the tone is recorded and is then converted from a time domain to a frequency domain using a Fast Fourier Transform (FFT) analysis. At step 525, the results of the FFT analysis are compared to a known frequency and intensity of the pre-produced and played tone to compare the recorded tone against the played tone. At step 530 a determination is made as to whether the recorded tone matches the played tone. For example, if the FFT analysis plots a single spike at 1000 Hertz and the played tone was a 1000 Hertz tone, then the test passes. If not, the method proceeds to step 535 and test fails, and the method ends at step 590. As should be understood, if no tone at all is recorded through the selected record line, then the line is designated as inoperable.

If desired the method may proceed to step 540, and the DC offset value, the SNR value, the THD value and THD+N value may be calculated using the FFT results calculated for the recorded tone. If the SNR, DC offset, THD, and THD+N values are acceptable as compared to acceptable threshold values for each of those tests, as described above with reference to FIGS. 2, 3, and 4, the test results in a pass for the sound card and for the selected record line. At step 545, if the comparison of any of those values does not result in an acceptable value as compared to acceptable value threshold levels, the test fails.

As briefly described above, if the sound card being tested in accordance with the steps described for FIG. 5 fails any of the described tests, the manufacturer or tester may isolate the sound card by inserting a known operable sound card and repeating the tests. If a failure still occurs in any of the foregoing described tests, the manufacturer or tester may then look to other components such as software modules responsible for passing sound data through the sound card as a possible source for an audio malfunction or quality deficiency. For example, if testing a microphone input line according to the steps described in FIG. 5, and a failure condition results, the microphone input line will not be marked in the registry of the computer 4 as operable until an acceptable test for the microphone input line is achieved after the sound card has been replaced or repaired. On the other hand, if the microphone input line according to the forgoing example passes the tests described above, a registry key in the computer 4 registry will be set to mark the microphone input line as acceptable for future use. Advantageously, utilizing the methods described above, testing for both an input line to the mixer and an output line from the mixer to a recorder may be performed at the same time by passing a pre-produced sound through an input line and out through an output line via the loopback function.

As described above, a series of application programming interfaces (API) are used for passing sounds or tones from one component of the sound card to another, described above. That is, once the test is initiated at step 510, a playback API call is initiated to cause a sound to be generated from the frequency synthesizer. A recording API call is made for causing the played sound to be recorded after having passed through the loopback mechanism 230 to the record line. According to an embodiment of the present invention, a set of standard Windows 32 APIs are used for calling the playback tone and for calling the recording tone. Exemplary Wave In APIs used for causing a tone or sound to be passed through an input include:
  waveInOpen
  waveInClose
  waveInGetDevCaps
  waveInGetNumDevs
  waveInPrepareHeader
  waveInUnprepareHeader.

An exemplary set of Wave Out APIs used for causing a sound or tone to pass through an output line or channel at different frequency settings, volume settings, and the like include:
  waveOutOpen
  waveOutClose
  waveOutGetDevCaps
  waveOutSetVolume
  waveOutSetPitch
  waveOutSetPlaybackRate
  waveOutWrite
  waveOutPrepareHeader
  waveOutUnprepareHeader Additionally, standard media control interface API's that are Windows operating system application interfaces that enable a software program to control multimedia devices such as the components of the sound cards 300 and 400 include (input and output API's):
  MCI APIs Used:
  mciSendCommand
  mciGetErrorString
  MIDI APIs Used:
  midiOutGetNumDevs
  midiOutGetDevCaps Additional API's for causing data to be passed through the audio components, as described above include memory mapped input output (MMIO) API's including:
  MMIO APIs Used:
  mmioOpen
  mmioClose
  mmioRead
  mmioAscend
  mmioDescend
  mmioFOURCC As known to those skilled in the art, the foregoing API's are asynchronous calls so that a playback call causing a tone to be passed through an input line and a recording call causing a tone to be passed through a recording line may be made simultaneously.

Figure 6:
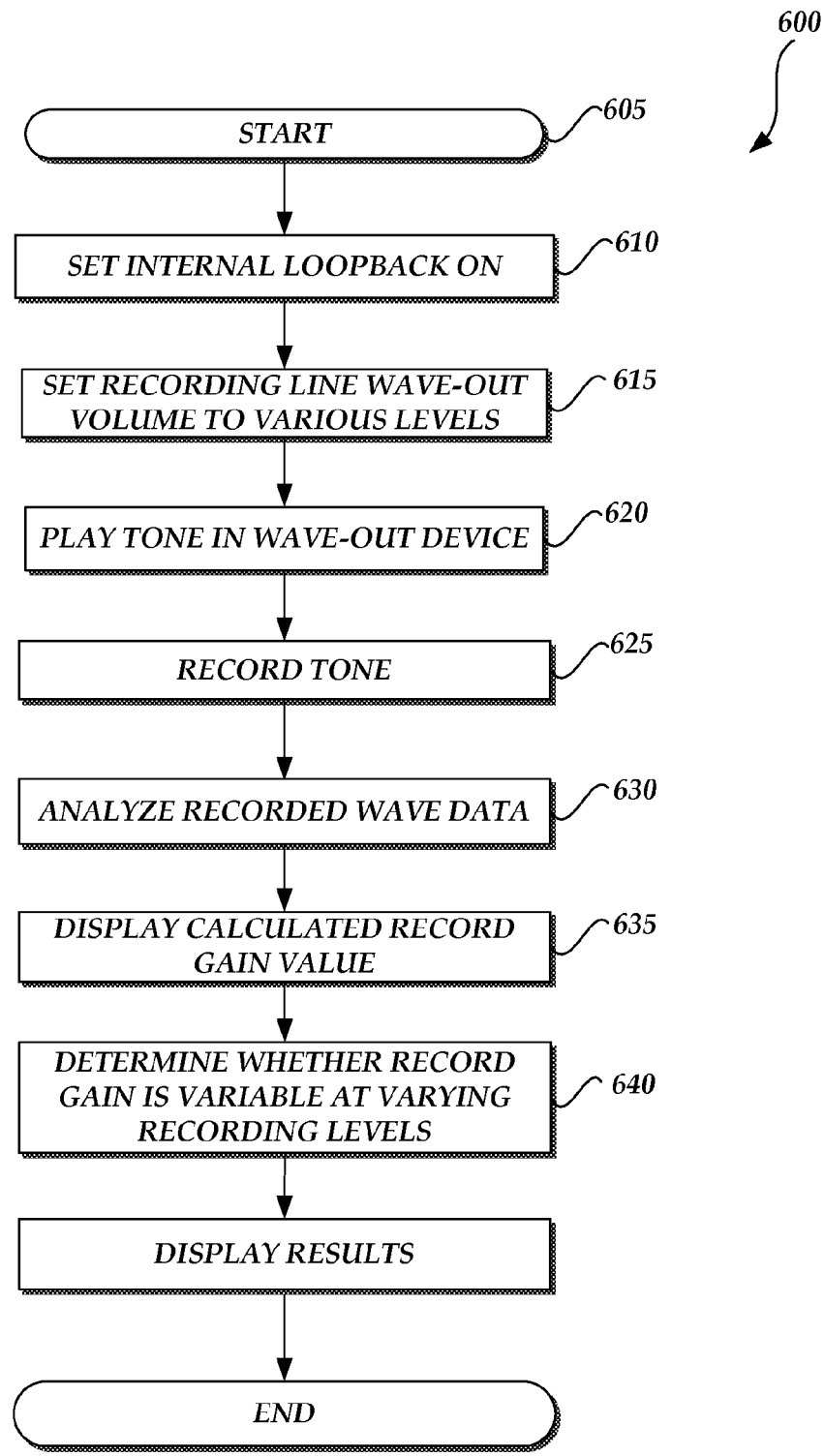
FIG. 6 illustrates an operational flow for non-interactive audio testing of the record gain associated with a computer sound card.

FIG. 6 illustrates an operational flow for a non-interactive audio test for testing the record gain associated with a given record output line. As should be understood by those skilled in the art, the record gain test provides information as to whether moving a volume setting up or down causes a corresponding gain change. According to prior art testing systems, an interactive human test user would be played a tone and would be requested to respond to changes in the volume of the tone as volume settings were changed. The method 600 begins at start step 605 and moves to step 610 where the internal loopback function is set to ON. At step 615, a WaveOut or recording output line is set at a specified volume level. At step 620, an API call causes a tone or sound to be played through the recording output line, as described above for FIG. 5. The tone is looped back through the digital signal processor where the tone is recorded at step 625.

At step 630, the recorded tone is analyzed using an FFT analysis and at step 635 the results of the record gain value are displayed. After the record gain value for a first setting is calculated and displayed, the method returns back to step 615, and the volume level is increased by a desired level, for example by 25%. The same tone is played through the record output line such as a speaker output line at the increased volume level, and the record gain value is calculated, as described above. After the test is performed at all desired volume levels, the volume levels are analyzed to determine whether the record gain varied with the varying recording volume levels, at step 640. If so, the record gain test is determined to have passed. That is, if the record gain test shows that consistent increases in the calculated gain are associated with the corresponding volume increases, the test passes for the output or input line in question. If not, the record gain test is determined to have failed which indicates that a problem with the volume control setting associated with the sound card 300 or 400 may exist.

Figure 7:
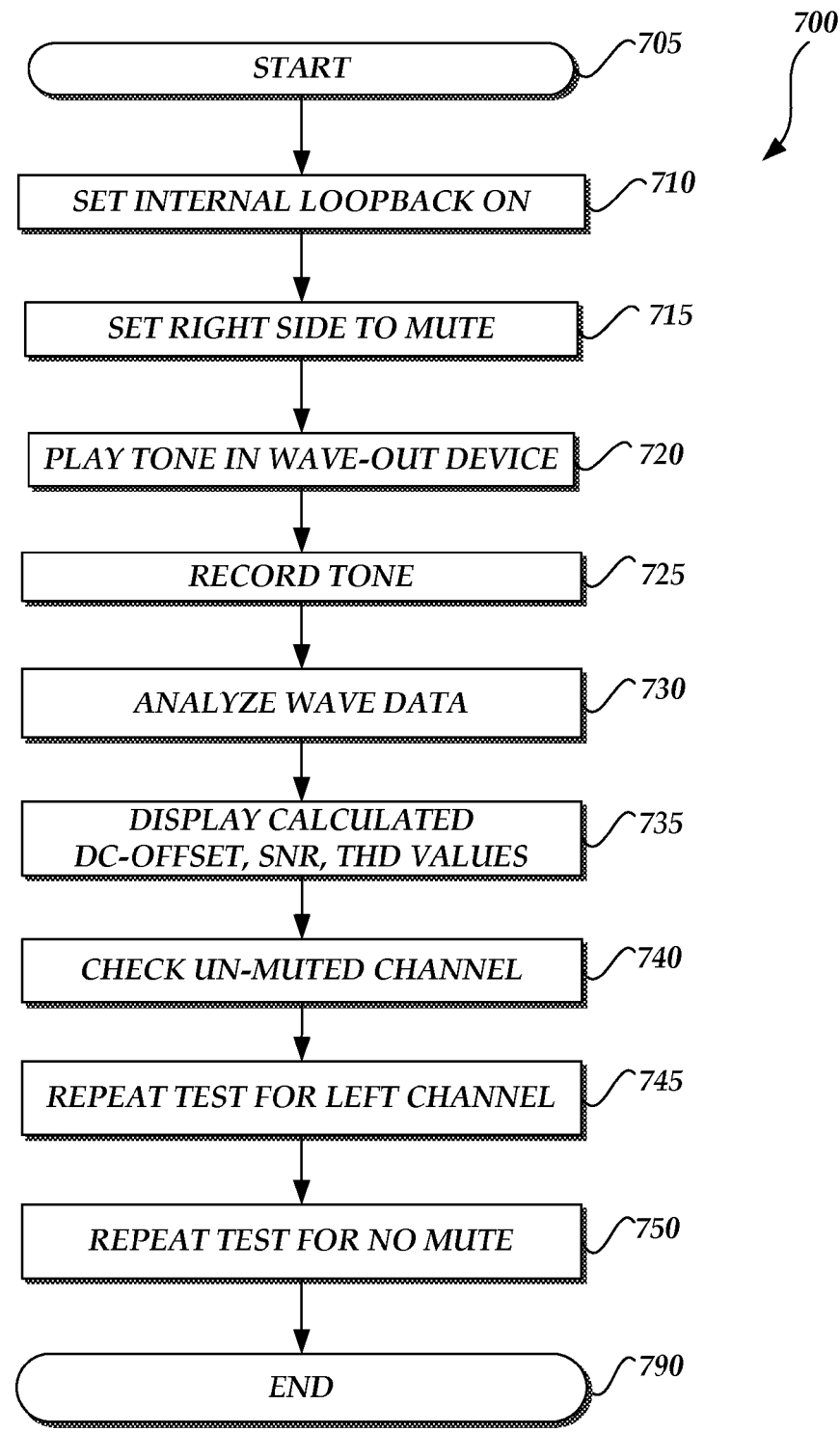
FIG. 7 illustrates an operational flow for non-interactive audio testing of stereo audio output lines.

FIG. 7 illustrates an operational flow for non-interactive audio testing of stereo audio output lines. For testing the stereo output lines associated with the sound cards 300, 400, a loopback test is passed through a given stereo output line as a recording output line while the other stereo line (right or left side) is muted. If a tone is recorded through the muted output line, an indication is presented that a problem exists where crossover noise or sound is passing through the muted record line. The method 700 begins at start step 705 and proceeds to step 710 where the internal loopback function described with reference to FIG. 4 above is set to ON. One of the two stereo sides, for example the right side is set to mute at step 715. At step 720, a pre-produced tone is played through the unmuted channel; at step 725 the tone played through the unmuted channel is recorded. As should be understood, previous steps described with reference to FIG. 5 for passing the sound through to the FFT analysis are applicable to this case.

Any sounds or tones passing through the muted channel are also recorded. At step 730, the recorded tones from the muted channel and the unmuted channel are analyzed using an FFT analysis. The muted channel is functioning properly if no sounds or tones are passing through the muted channel. It is expected that a flat FFT signal without a peak or spike associated with the frequency and intensity of the played tone will be presented. If an FFT signal is presented with a peak or spike at a position that would be expected in the unmuted channel is found for the muted channel, the indication is that the sound or tone passed through the unmuted channel has crossed over through the muted channel.

At step 735 the calculated DC Offset, SNR, THD and THD+N values are calculated and analyzed as described above. At step 740 the unmuted channel may be tested for general operability, as described with reference to FIG. 5. At step 745, the test is repeated using the reverse orientation where the first muted channel is unmuted and the first open channel is muted. At step 750, the test is repeated with no mute applied to either channel so that the operability of both channels is tested simultaneously. As should be understood, testing both lines simultaneously without applying muting to either line may also be used to test the record gain in the two lines to make sure that neither line is louder than the other line when volume settings are set to the same setting for each line. The method ends at step 790.

Figure 8:
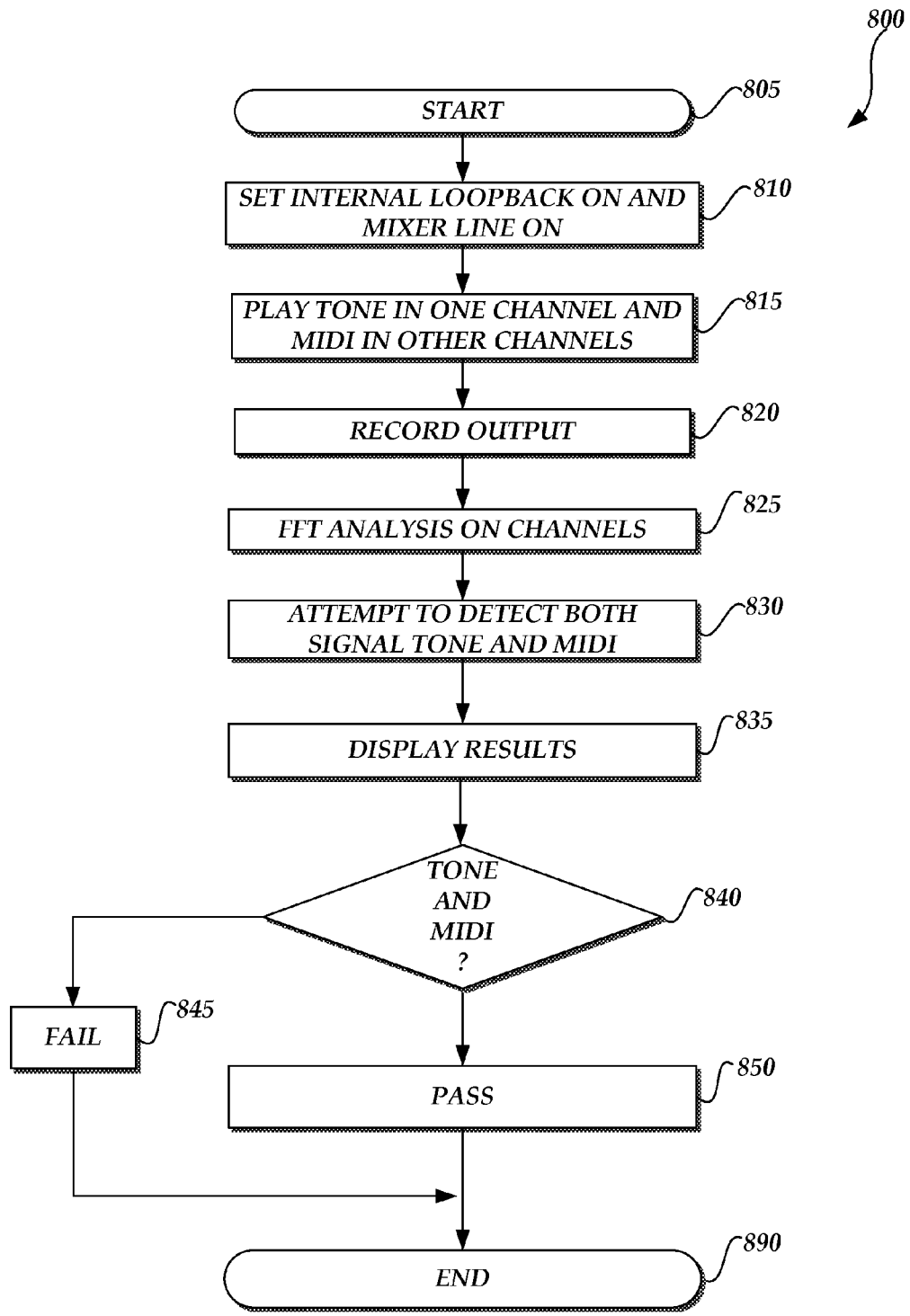
FIG. 8 illustrates an operational flow for non-interactive audio testing of an audio mixer.

FIG. 8 illustrates an operational flow for non-interactive audio testing of an audio mixer line. Testing a mixer component 430 as described with reference to FIG. 4 provides useful information as to the results of mixing a combination of tones or sounds. The method 800 begins with start step 805 and proceeds to step 810 where the internal loopback function is set to ON for the mixer integrated circuit 430 described with reference to FIG. 4. At step 815, an API calls the playback of a tone through one record output channel and simultaneously a MIDI sound file is called through other channels. The single tone of a known frequency intensity and the MIDI file having known sound characteristics are mixed through the mixer 430 and the output is recorded at step 820.

Figure 9:
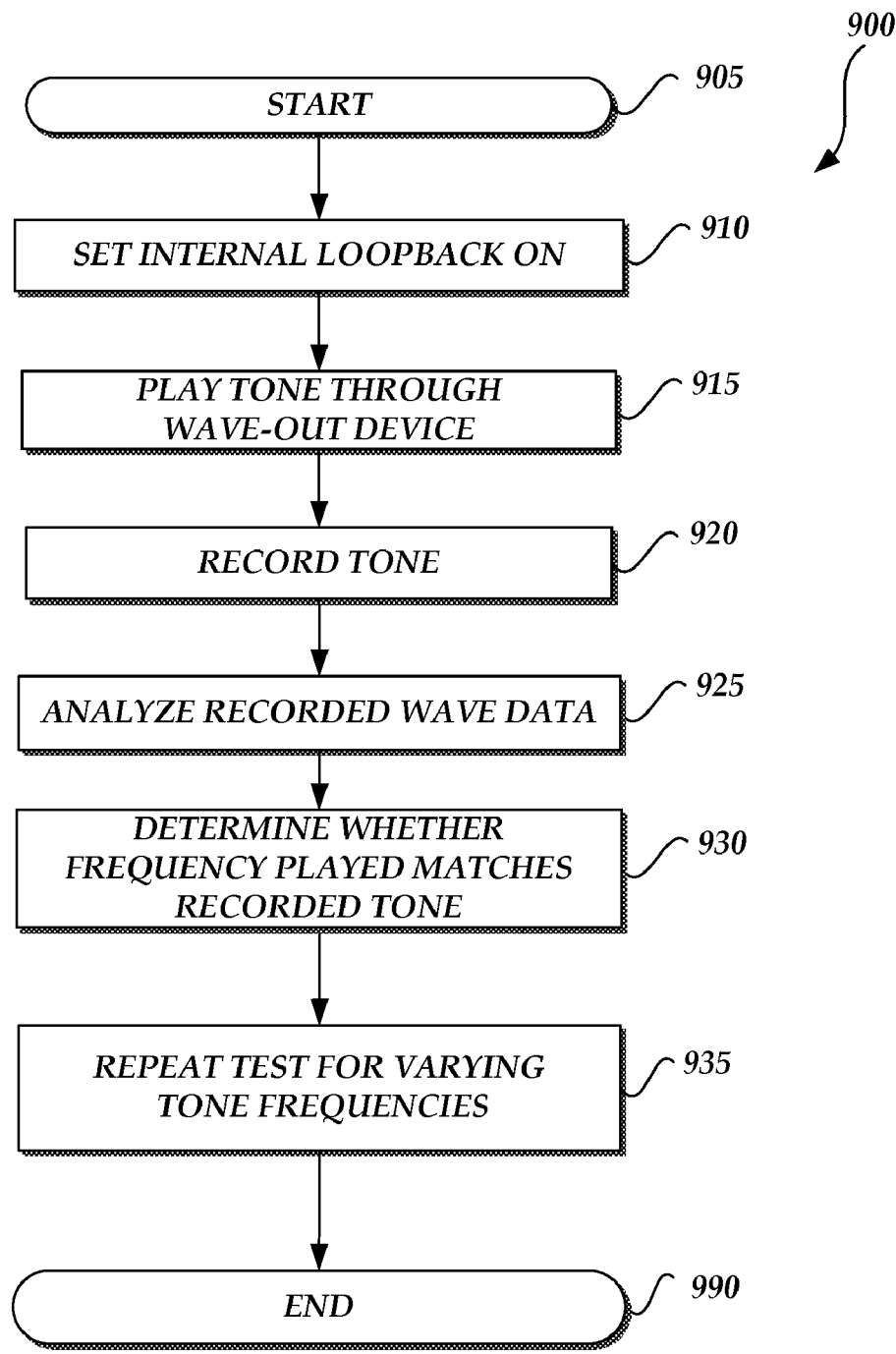
FIG. 9 illustrates an operational flow for non-interactive audio testing of a tone output over a varying frequency range.

At step 825 an FFT analysis is performed on the output of all channels through which tones or sounds are recorded in accordance with the test. At step 830, a determination is made as to whether an FFT peak or spike in the recorded tone is associated with the known single tone and whether FFT peaks or spikes in the recorded tones or sounds are associated with frequencies and intensities for the MIDI file. At step 835, the results are displayed. At step 840, a determination is made as to whether the known single tone and the known MIDI file tones were recorded after having passed through the mixer line. If not, an indication is presented that one of either the single tone or the MIDI file tones was not mixed properly by the mixer 430, and the method proceeds to step 845 and a failure condition is presented. If both the single tone and the MIDI file tones are detected after passing through the mixer 430, the mixer 430 is determined to have passed the test at step 850. The method ends at step 890. Exemplary APIs used for causing a tone or sound to be passed through, processed by and passed out of the mixer 430 include:

Mixer APIs Used:
    mixerGetLineInfo
    mixerGetLineControls
    mixerGetControlDetails
    mixerSetControlDetails
    mixerOpen
    mixerClose
    mixerGetDevCaps FIG. 9 illustrates an operational flow for a non-interactive audio testing through a record output line over varying frequency ranges. The method 900 starts at step 905 and proceeds to step 910 where the internal loopback function is set to ON. A pre-produced sound or tone is analyzed at a first known frequency at steps 915-925 in the same manner as described in reference to FIG. 5. In the first instance, a determination is made as to whether the played toned is passed through the output line and recorded properly as described with reference to FIG. 5. After the recorded tone is analyzed at step 925, a determination is made as to whether the frequency played through the record output line matches the frequency of the recorded tone at step 930. If so, the test for that specific frequency passes. At step 935, the test is repeated at varying frequencies of tones passed through the record output line. If it is determined that the recorded tones at each of the prescribed frequencies are recorded through the output line at matching frequencies, the frequency range test is determined to have passed. On the other hand, if the frequencies of recorded tones do not match the frequencies of the corresponding played tones, the frequency range test is determined to have failed.

Figure 10:
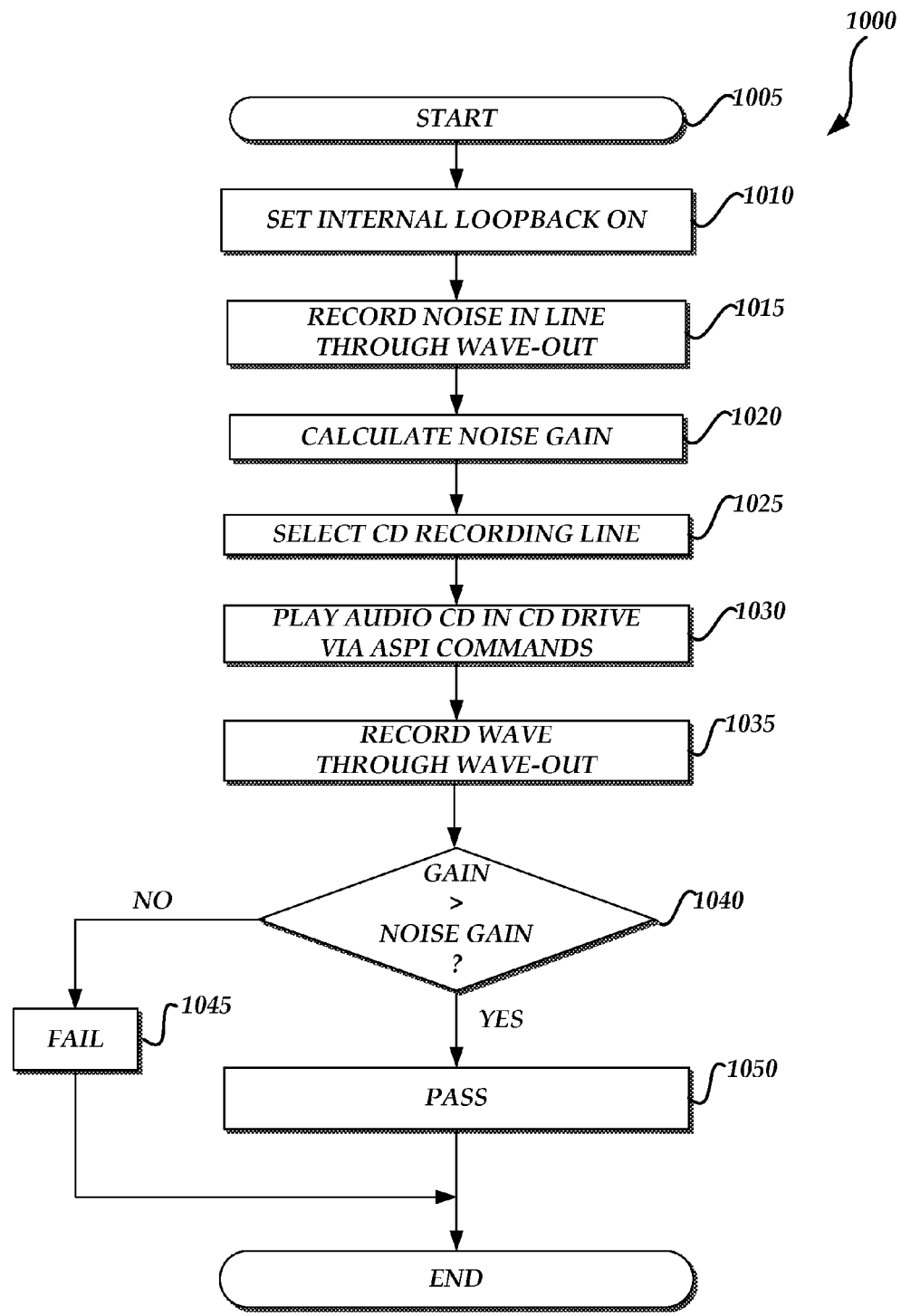
FIG. 10 illustrates an operational flow for non-interactive audio testing of a CD cable connection configuration.

FIG. 10 illustrates an operational flow for a non-interactive audio testing of a CD-ROM cable connection configuration. As is known to those skilled in the art, many CD-ROM units pass data to a bus 22, as illustrated in FIG. 1, but also have an audio output cable which should be connected from the CD-ROM unit to the audio sound card 300, 400 described above with reference to FIGS. 2 and 3. If the audio output cable is not connected from the CD unit to the sound card, output from the CD-ROM will not pass through to the sound card. A manufacturer or other tester may want to test the CD output cable connection between the CD unit and the sound card prior to shipping the computer 4.

Referring to FIG. 10, the method 1000 begins at start step 1005 and proceeds to step 1010 where the internal loopback function is set to ON. At step 1015, the WaveOut device such as the frequency synthesizer 210 passes a known noise sound through a record output line through which sounds or tones will be received from a connected CD unit. At step 1020, the noise gain associated with the passed noise is calculated. At step 1025, the CD unit recording is set to ON, and at step 1030, an audio CD in the CD unit drive is played using Advanced SCSI Programming Interface (ASPI) commands. At step 1035, the tone is played and is looped back through the record output line associated with the connector between the CD unit and the sound card. The tones or sounds are recorded, as described with reference to FIG. 5, and the gain associated with the played CD sounds or tones is calculated. Step 1040, the gain associated with the played CD (Compact Disc) sound or tone is compared to the gain associated with the noise. If the gain associated with the played sounds or tones is greater than the noise gain, the method proceeds to step 1050 and a determination is made that the output cable between the CD unit and the sound card is connected. If the gain associated the played tones from the CD are not greater than the noise gain, the method proceeds to step 1045 and the test is determined to have failed.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

What is claimed is:

1. A computer-implemented method for testing a record gain associated with a computer sound card having a wave table synthesizer and a memory storing a sample of a pre-produced digital tone, the method comprising executing a diagnostic application program on a computer containing the computer sound card, the diagnostic application program, when executed by the computer, configured to:

utilize the wave table synthesizer of the computer sound card to play the pre-produced digital tone from the sample stored in the memory of the computer sound card at a first volume intensity and a second volume intensity;

convert the pre-produced digital tone at each of the first and second volume intensities to analog format tones;

pass the analog format tones to a mixer of the computer sound card;

after the analog format tones are received at the mixer, loop the analog format tones through an internal loopback mechanism of the computer sound card to a recording audio channel of the computer sound card;

convert the analog format tones to second digital format tones at each of the first and second volume intensities;

record the second digital format tones at each of the first and second volume intensities;

convert each of the recorded second digital format tones from a time domain to a frequency domain;

calculate a first record gain value for the recorded second digital format tone at the first volume intensity;

calculate a second record gain value for the recorded second digital format tone at the second volume intensity; and if the first record gain value varies from the second record gain value in proportion to a variation between the first volume intensity and the second volume intensity, designate the recording audio channel as passing a record gain test.

2. The computer-implemented method of claim 1, wherein converting the second digital format tones from a time domain to a frequency domain comprises converting the second digital format tones from a time domain to a frequency domain via a Fast Fourier Transformation (FFT).

3. A system for testing a record gain associated with a computer sound card in a computer, the system comprising:

a computer sound card comprising a mixer, a recording channel, a wave table synthesizer, and a memory storing a sample of a pre-produced digital tone;

a processor; and a system memory operatively coupled to the processor and containing computer-readable instructions that, when executed by the processor, cause the processor to utilize the wave table synthesizer to play the pre-produced digital tone from the sample at a first volume intensity and a second volume intensity, convert the pre-produced digital tone at each of the first and second volume intensities to analog format tones, pass the analog format tones to the mixer, loop the analog format tones through an internal loopback mechanism of the mixer to the recording channel, convert the analog format tones to second digital format tones at each of the first and second volume intensities, convert each of the second digital format tones from a time domain to a frequency domain via a fast Fourier transformation, calculate a first record gain value for the second digital format tone at the first volume intensity, calculate a second record gain value for the second digital format tone at the second volume intensity, and if the first record gain value varies from the second record gain value in proportion to a variation between the first volume intensity and the second volume intensity, designate the recording channel as passing a record gain test.

4. A computer storage medium, containing computer-executable instructions that, when executed by a computer, cause the computer to:

utilize a wave table synthesizer of a computer sound card to play a pre-produced digital tone from a sample stored in a memory of the computer sound card at a first volume intensity and a second volume intensity;

convert the pre-produced digital tone at each of the first and second volume intensities to analog format tones;

pass the analog format tones to a mixer of the computer sound card;

loop the analog format tones through an internal loopback mechanism to a recording channel of the computer sound card;

convert the analog format tones to second digital format tones at each of the first and second volume intensities;

convert each of the second digital format tones from a time domain to a frequency domain via a fast Fourier transformation;

calculate a first record gain value for the second digital format tone at the first volume intensity;

calculate a second record gain value for the second digital format tone at the second volume intensity; and upon determining that the first record gain value varies from the second record gain value in proportion to a variation between the first volume intensity and the second volume intensity, designate the recording channel as passing a record gain test.

* * * * *